US010430811B1

(12) United States Patent
Roberts et al.

(10) Patent No.: US 10,430,811 B1
(45) Date of Patent: Oct. 1, 2019

(54) TRANSACTION-SPECIFIC CUSTOMER SURVEY SYSTEM

(71) Applicant: AFTERWORDS, INC., Tampa, FL (US)

(72) Inventors: Steven A. Roberts, Tampa, FL (US); Drew Peloubet, Tampa, FL (US)

(73) Assignee: AFTERWORDS, INC., Tampa, FL (US)

( * ) Notice: Subject to any disclaimer, the term of this patent is extended or adjusted under 35 U.S.C. 154(b) by 0 days.

(21) Appl. No.: 16/456,490

(22) Filed: Jun. 28, 2019

Related U.S. Application Data

(63) Continuation-in-part of application No. 16/279,387, filed on Feb. 19, 2019, which is a continuation of application No. 14/997,434, filed on Jan. 15, 2016.
(Continued)

(51) Int. Cl.
*G06Q 30/00* (2012.01)
*G06Q 30/02* (2012.01)
(Continued)

(52) U.S. Cl.
CPC ... *G06Q 30/0201* (2013.01); *G06Q 10/06395* (2013.01); *G06Q 20/20* (2013.01);
(Continued)

(58) Field of Classification Search
None
See application file for complete search history.

(56) References Cited

U.S. PATENT DOCUMENTS 5,832,458 A * 11/1998 Jones .................. G06Q 20/202
                                                        705/14.26
6,078,891 A *  6/2000 Riordan ............... G06Q 20/20
                                                           705/16
(Continued)

OTHER PUBLICATIONS

Ron Borzekowski, Elizabeth K. Kiser, The choice at the checkout: Quantifying demand across payment instruments, International Journal of Industrial Organization, vol. 26, Issue 4, Jul. 2008, pp. 889-902, ISSN 0167-7187.
(Continued)

*Primary Examiner* — Gurkanwaljit Singh
(74) *Attorney, Agent, or Firm* — Shumaker, Loop & Kendrick, LLP; Jeffrey B. Fabian

(57) ABSTRACT

Provided are a method and system for automatically generating context-based survey questions predicated on the customers' actual purchase experience with the merchant, thus eliminating for the customer the need to respond to obvious, redundant, and even irrelevant questions, and providing to the merchant customer feedback directly bound to the actual purchase event and correlating data. Purchase information is stored at the time of purchase and the customer is given an identifier for the purchase. Then, at the customer's convenience, either at the point of sale or through a networked computer, the customer can provide responses to questions that are selectively and automatically generated based on the items purchased, or other definable attributes associated with the sale, and based upon configurable preferences of the merchant. Survey questions are displayed and feedback responses are stored, analyzed and associated with purchase information in real time.

19 Claims, 9 Drawing Sheets

Related U.S. Application Data

(60) Provisional application No. 62/104,043, filed on Jan. 15, 2015.

(51) Int. Cl.
    *G06Q 10/06*     (2012.01)
    *G06Q 20/20*     (2012.01)
    *G07G 1/00*     (2006.01)
    *H04B 5/00*     (2006.01)
    *G07G 1/14*     (2006.01)

(52) U.S. Cl.
    CPC ..... *G06Q 30/0202* (2013.01); *G06Q 30/0205* (2013.01); *G07G 1/0009* (2013.01); *G07G 1/14* (2013.01); *H04B 5/0025* (2013.01); *Y04S 10/54* (2013.01); *Y10S 707/99933* (2013.01)

(56) References Cited

U.S. PATENT DOCUMENTS

| | | | | |
|---|---|---|---|---|
| 6,839,682 B1* | 1/2005 | Blume | G06Q 30/02 | 705/14.4 |
| 7,328,169 B2* | 2/2008 | Temares | G06Q 30/02 | 705/14.25 |
| 7,792,697 B2* | 9/2010 | Bhagchandani | G06Q 30/02 | 705/14.49 |
| 7,937,286 B2* | 5/2011 | Newman | G06Q 30/02 | 705/7.31 |
| 8,027,891 B2* | 9/2011 | Preston | G06Q 40/00 | 705/30 |
| 8,255,268 B2* | 8/2012 | Rane | G06Q 30/0202 | 705/7.33 |
| 8,328,094 B2* | 12/2012 | Proud | G06Q 20/20 | 235/383 |
| 8,417,561 B2* | 4/2013 | Ghosh | G06Q 30/0205 | 705/7.34 |
| 9,208,481 B2* | 12/2015 | Arzumanyan | G06Q 20/0453 | |
| 2002/0026348 A1* | 2/2002 | Fowler | G06Q 30/02 | 705/14.11 |
| 2003/0018550 A1* | 1/2003 | Rotman | G06Q 30/02 | 705/35 |
| 2003/0216981 A1* | 11/2003 | Tillman | G06Q 20/04 | 705/34 |
| 2006/0151598 A1* | 7/2006 | Chen | G06Q 20/20 | 235/380 |
| 2007/0050229 A1* | 3/2007 | Tatro | G06Q 10/087 | 705/15 |
| 2007/0055597 A1* | 3/2007 | Patel | G06Q 30/0206 | 705/35 |
| 2007/0100728 A1* | 5/2007 | Rotman | G06Q 30/02 | 705/36 R |
| 2009/0006151 A1* | 1/2009 | Zarghami | G06Q 10/06375 | 705/7.31 |
| 2010/0010905 A1* | 1/2010 | Arzumanyan | G06Q 20/0453 | 705/21 |
| 2010/0070376 A1* | 3/2010 | Proud | G06Q 20/20 | 705/21 |
| 2010/0076813 A1* | 3/2010 | Ghosh | G06Q 30/02 | 705/7.34 |
| 2010/0280881 A1* | 11/2010 | Faith | G06Q 10/06375 | 705/7.34 |
| 2011/0087519 A1* | 4/2011 | Fordyce, III | G06Q 30/02 | 705/7.29 |
| 2011/0196754 A1* | 8/2011 | Proud | G06Q 20/20 | 705/16 |
| 2012/0109709 A1* | 5/2012 | Fordyce, III | G06Q 30/02 | 705/7.29 |
| 2014/0372184 A1* | 12/2014 | Blumenthal | G06Q 30/0217 | 705/7.41 |
| 2016/0247111 A1* | 8/2016 | Blumenthal | G06Q 10/06395 | |

OTHER PUBLICATIONS

Shankar, Venkatesh, and Sridhar Balasubramanian. "Mobile marketing: a synthesis and prognosis." Journal of Interactive Marketing 23.2 (2009): 118-129.

Lang, M. C. (2010). Entrepreneurial idea identification through online social networks. (Order No. 3440018, Morgan State University). ProQuest Dissertations and Theses,145.

* cited by examiner

FIG. 9

Did you enjoy your boneless wings?

| No | Not Really | Yes | Very Good | Great!! |

Did you enjoy your Taco Salad?

| Very Bad | Not Good | Acceptable | Good | Great!! |

How was your server, Tiffany?

810

| Very Bad | Not Good | Acceptable | Good | Great!! |

Will you return?

| Yes | No |

| Done |

TRANSACTION-SPECIFIC CUSTOMER SURVEY SYSTEM

CROSS-REFERENCE TO RELATED APPLICATIONS

This application is a continuation in part of co-pending U.S. Non-provisional application Ser. No. 16/279,387 filed Feb. 19, 2019, which application is incorporated herein by reference.

TECHNICAL FIELD

The present invention relates to a computer method and system for receiving customer feedback and information relating to a purchase, and more particularly, automatically generating a particular questionnaire for each purchase and linking the questionnaire results to transaction data.

BACKGROUND

In any business, keeping customers satisfied is critical. Many techniques have been used to determine the level of customer satisfaction. One technique provides for analyzing sales histories and related product matrices. However, only limited information is typically gathered from sales histories. For example, while analyzing sales history for a particular product or group of products may provide information about which products are beginning to weaken in sales, little if any information is provided about why particular products are slowing in sales. Furthermore, although sales history may provide information about regional buying trends, it usually cannot indicate why a particular customer was dissatisfied.

Getting customer response through the use of generic surveys has several disadvantages. First, surveys tend to be impersonal and ask general questions such as "How was your meal?" or "Would you shop here again?" that are not unique to a particular customer's experience. Second, surveys are often unnecessarily cumbersome to complete. For example, a survey may ask for the product name, identifier (survey token), serial number, store purchased from, purchase price, purchase date, and a host of other questions unrelated to a particular customer's feedback. While the answers to these questions may be important to determine which product or service the customer is commenting on, a customer looking over this type of survey often determines that too much work must be done that is unrelated to their particular transaction and foregoes answering any of the questions in the survey.

Many merchants, such as retail establishments, restaurants and other service providers, use modem Point-of-Sale (POS) systems that capture rich details around their customers' purchasing activity. This information, herein referred to as a customer-check, receipt, bill or simply check, however, has never been made available for the customer to interact with in terms of survey and satisfaction. With most POS systems, check-level data can include: the server or cashier, the date and time of service, the check duration, the table, the location, the mode, and each item ordered on the check plus modifications, comps, etc. applied to the check—this is rich data to the customer. Other systems provide customer satisfaction surveys but they ask only a pre-determined set of questions and rarely (if ever) provide actual feedback on the customers' specific experience. To get check-level survey information many businesses hire "Secret Shoppers" (secret only in that the merchant does not know they are professional consumer/survey takers) to provide feedback on service, product purchases, and experience.

What is needed is a system that allows customers to provide valuable feedback for merchants not only through pre-set survey campaigns or template(s), but also in obtaining detailed feedback on the customer's specific experience such as the actual items sold, the transaction amounts (i.e., price), the server (i.e., waitress or waiter), the table, the time of day, the mode of service delivery (i.e., sitting down at a table, drive through, delivery), and more.

SUMMARY

The invention includes method and system for automatically generating context-based survey questions predicated on the customers' actual purchase experience with the merchant, thus eliminating for the customer the need to respond to obvious, redundant, and even irrelevant questions, and providing to the merchant customer feedback directly bound to the actual purchase event and correlating data. Purchase information is stored at the time of purchase as transaction data, and the customer is given an identifier for the purchase. The transaction data may be stored locally to a point-of-sale ("POS") device or to a remote location, such as a cloud service provider. Then, at the customer's convenience, either at the point of sale or through a networked computer, the customer can provide responses to questions that are selectively and automatically generated based on the items purchased, or other definable attributes associated with the sale, and based upon configurable preferences of the merchant included within a Campaign data structure. Survey questions are displayed and feedback responses are stored, analyzed and associated with transaction data in real time.

In accordance with the present invention, there is provided a method and system for automatically generating questions, receiving customer feedback, and associating the feedback with transaction data. With this invention, transaction data is stored at the time of purchase and the customer is given a survey token correlating to the purchase. The token can be any data or information that is useful for identifying the customer or transaction, such as a (i) randomly generated number; (ii) a customer account ID, or (iii) a combination of transaction data elements, such a facility identifier and the date and time of the transaction. Then, at the customer's convenience, either at the point of sale or through any web-enabled device, the customer can provide feedback to questions that specifically relate to the items purchased. This feedback is then stored, associated with the purchase information, and immediately available for analysis.

Specifically, in accordance with the present invention, there is provided a method of providing a web-service (WS) that allows merchants, such as retailers and service providers, to integrate a check-level survey module into their own branded web-site using java tags or any suitable means known to one of skill in the art. This WS feature allows customers to participate in a survey within the merchant's web-site and to interact with their check details and other survey features being delivered to the merchant web-site using a Customer Survey Module (CSM or GSM (Guest Survey Module)) web-service as the data-integration and storage platform.

The invention may be implemented as a computer process, a computing system or as an article of manufacture such as a computer program product or computer readable media. The computer program product may be instructions for executing a computer process encoded on a computer storage media readable by a computer system. The computer program product may also be instructions for executing a computer process encoded on a propagated signal on a carrier readable by a computing system.

These and various other features as well as advantages, which characterize the present invention, will be apparent from a reading of the following detailed description and a review of the associated drawings.

BRIEF DESCRIPTION OF THE DRAWINGS

FIG. 9 shows an example questionnaire that includes a list of feedback questions that could be asked of a customer; and

DETAILED DESCRIPTION

In the following detailed description of example embodiments of the invention, reference is made to the accompanied drawings, which form a part hereof, and which are shown by way of illustration, specific illustrative embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Figure 1:
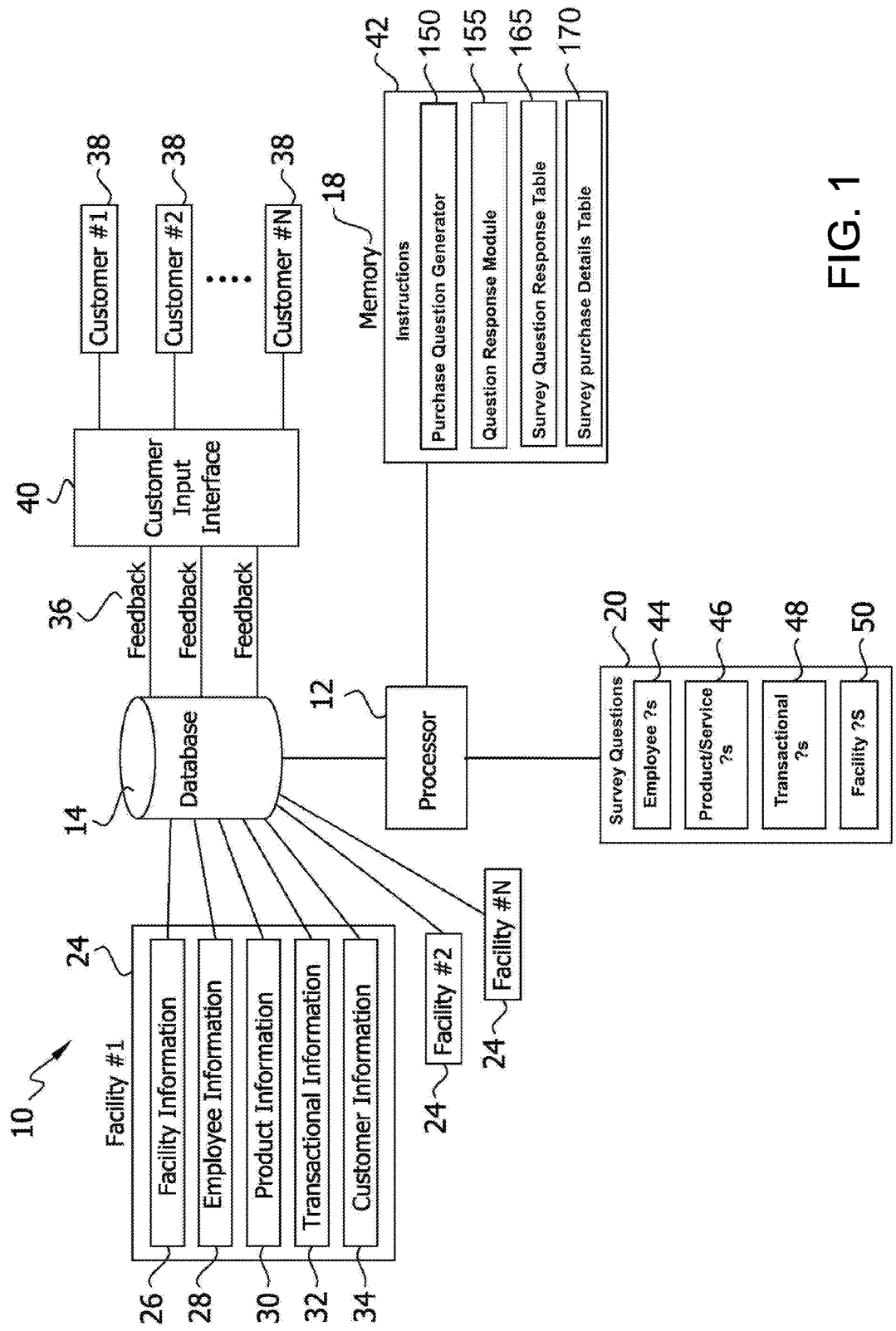
FIG. 1 is a block diagram of a system according to one embodiment of the invention.

The inventive survey system is described below. For the sake of illustration a scenario involving a customary transaction at a dining establishment is presented. The invention, however, is not limited to such transactions. As one will appreciate after reading the following description, the inventive system has equal utility in other commercial transactions including, but not limited to, retail, wholesale, online sales, hospitality, hotel, fine dining, fast food and other product or service transactions FIG. 1 is a block diagram of a system 10 according to one embodiment of the invention. The system 10 combines product/service, transaction, employee, team and facility data and customers' experiences during commercial transactions to provide various metrics associated with the performance of a particular employee, team, store(s)/region (e.g., a facility), for example, metrics related to customer feedback, employee performance metrics, and process improvement metrics for the facility. As used herein, instructions and/or rules mean computer executable instructions. It should also be noted that the term "customer" is synonymous with the term "guest" and term "user" generally denotes an individual associated with a merchant that utilizes the system disclosed herein.

System 10 includes a processor 12 connected to a database 14, a set of computer-executable instructions stored in a memory 18, a plurality of survey questions 20, and an interactive customer interface 40. Database 14 can store information from multiple facilities 24. As shown, there may be more than one facility 24 (e.g., Facility #1, Facility #2, Facility #N). For example, Database 14 stores facility information 26 regarding an identity of a particular facility; employee information 28 regarding the identity of each employee at the facility and their performance over a period of time; product/service information 30 identifying products/services available for purchase at each facility; transactional information 32 regarding the amount of product/services sold to a particular customer during a particular transaction, metrics regarding sales quota, and the like; and customer information 34 such as a customer's identity, e-mail address, enrollment in a loyalty program and other particulars.

In addition, Database 14 is populated with customer feedback information 36 regarding a commercial transaction made by the customer, via survey, after purchasing a product/service at one of the facilities 24. For example, a customer who has purchased a product/service at a facility 24 can access a customer interface 40 through various modalities (e.g., kiosk, mobile application or website) to provide feedback 36 (e.g., via surveys) regarding the specific commercial transaction. In general, as used herein, an interface is a component of computer executable instructions stored in a tangible, non-transitory medium and executed by processor 12 to present a display of information related to the interface allowing someone to view and/or interact with the presented information.

Processor 12 executes computer-executable instructions that are stored in memory 18, which instruct processor 12 to utilize the facility information 26, employee information 28, product information 30, and transactional information 32 for each facility 24 in order to generate invitations for customers 38 to respond to surveys 20 regarding their transactions. For example, in one embodiment, processor 12 executes the computer-executable instructions for processing the facility data 24 to determine which of the facility's customers 38 will receive a survey. The customer feedback 36 is stored in Database 14 and related to the customer information 34 identifying a particular customer 38.

In a preferred embodiment, processor 12 executes the computer-executable instructions for processing the facility data 24 to identify the facility's customers 38. Invitations to the survey can be transmitted by email or through a mobile application on the customer's electronic device. Alternatively, the URL of a website through which the customer can access the survey can be printed on the customers transaction receipt. The customer feedback 36 is stored in Database 14 and related to the customer information 34 identifying a particular customer 38. Further, processor 12 executes computer-executable instructions for processing transaction information 32 to determine the composition of the survey to be delivered to customer.

All data categories or purchase detail identifiers can be organized into database records called Attribute Groups. An Attribute Group is a collection of data classes or purchase detail identifiers sharing a preselected attribute and that are, thus, organized according to definable and changeable merchant user defined, or auto generated criteria. For example, facilities can be organized into a plurality of Attribute Groups where all facilities in the Attribute Group share a preselected attribute, like facility size. The preselected attribute criteria for a facility Attribute Group could be, for example, square footage so that all facilities within a given range of square footage are grouped together. Other illustrative criteria could be facilities located in shopping malls, facilities opened within the last six months, or menu items identified by the merchant as being seasonal menu items. Any attribute criteria are suitable for defining an Attribute Group.

Attribute Groups can also be used for other data categories (i.e., purchase detail identifiers) as well. Employees, for example, can be placed in Attribute Groups based on sharing attributes related to location, seniority, title, status, education, attendance record or demographic information. All data categories and purchase detail identifiers are capable of being placed in Attribute Groups. Accordingly, and using FIG. 1 as an example, Attribute Groups can be meta-data references to sets of facility information 26, employee information 28, product information 30, transactional information 32 and customer information 34. Similarly Attribute Groups can be larger meta-data references to sets of facilities 24.

Figure 2:
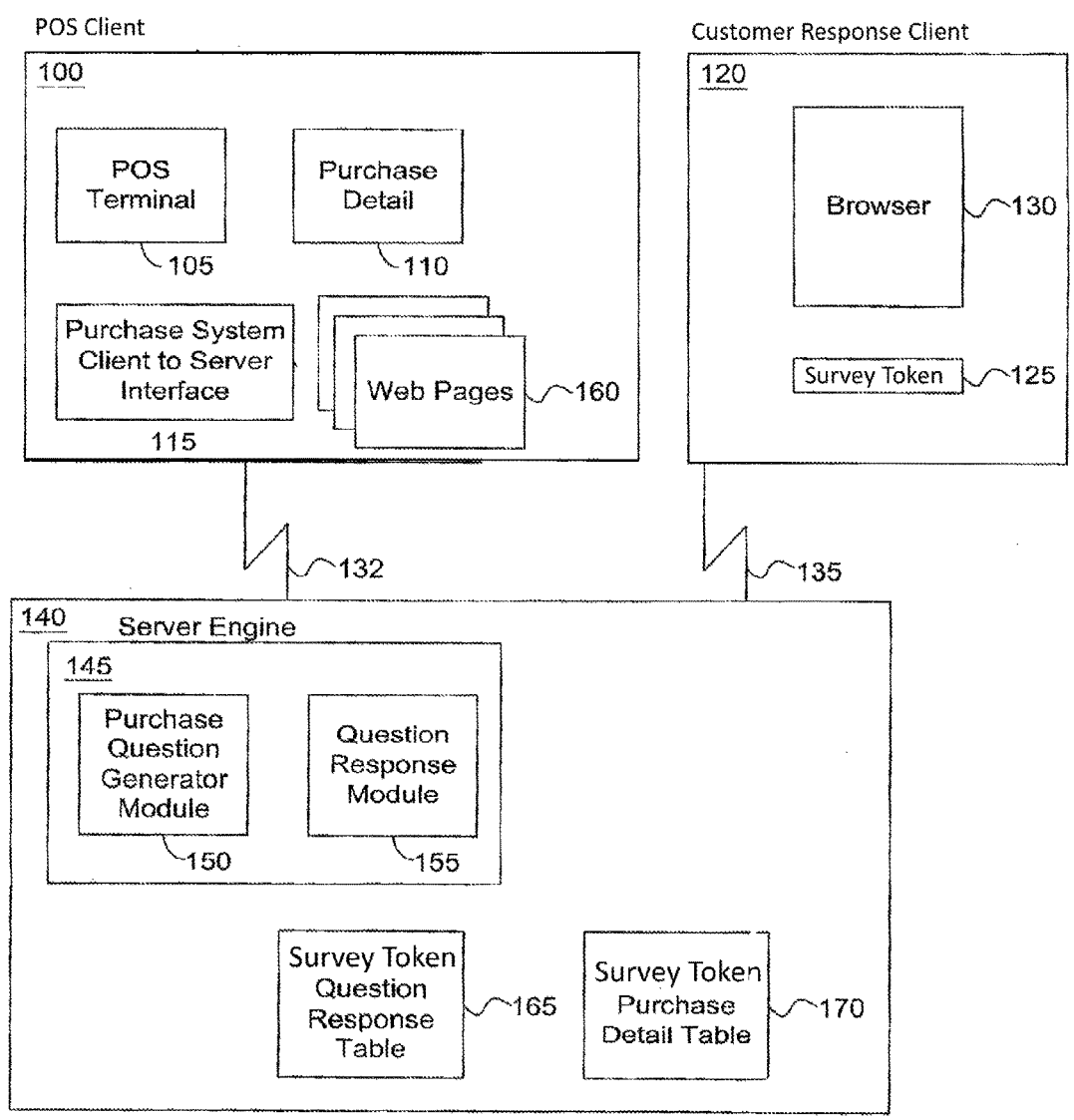
FIG. 2 shows a block diagram for a system for receiving customer feedback in a GSM-Web Services configuration.

FIG. 2 shows a block diagram for a system for receiving customer feedback in a client/server configuration. POS client 100 includes point of sales (POS) terminal 105, purchase detail component 110, purchase system client to server interface 115 and web pages 160. POS terminal 105 represents anywhere a purchase takes place and includes on-line purchasing, restaurants, grocery stores, department stores, and other places where goods or services are purchased. Purchase detail component 110 collects transaction data that may include price, quantity, and name of each item purchased, time and date of purchase, employees on duty, the mode of service delivery, and/or any other relevant information associated with a purchase. The purchase detail component 110 may store transaction data locally to a POS device, a merchant server, or to a remote location, such as a cloud service provider. When a customer uses a loyalty card or some other means of identification during the purchase, purchase detail component 110 may collect a survey token that identifies the particular customer or transaction. As used herein a "token" can be any identifying information that identifies a particular customer or transaction. In the case of a customer token, for example, the token can be a unique identifier generated at the point of sale or the token can be a loyalty program account number. The customer token can also be a name, email address or the like. The token can be generated by the point of sale system or can be connected to the merchant's customer records management (CRM) software and/or loyalty program database.

The token can also be a composite of multiple types of data. For example, the token can comprise a facility identification number, transaction number (e.g., a receipt or check number), and transaction date. Similarly the token can comprise a facility identification number, register number and employee identification. These and many other data points are often present on checks/receipts and can be used in combination as a token.

All data received from a vendor is normalized for full data alignment. For example, continuing with the example of a restaurant transaction, different vendors convey the same information differently. A hamburger on a check from a first vendor may state "Hamburger" while a second vendor may list it as "HMBRG" while a third vendor may list the item under a name such as "Super Bacon Burger."

Purchase system client to server interface 115 provides an interface between purchase system client 100 and server 140. Purchase system client 100 communicates with server 140 through communication link 132.

A typical server 140 includes server engine 145, response table 165, and purchase detail table 170. Server engine 145 includes purchase question generator module 150 and question response module 155. Server 140 includes communications link 132 to purchase system client 100 and communication link 135 to customer response client 120. Purchase question generator module 150 generates questions based on purchase information stored in purchase detail table 170 and preference data associated with merchant preferences. The merchant preferences can be formatted as a Campaign, which is a data structure that includes Conditions, Survey Questions, Events, Incentives, Exit Pages, groupings and general logic utilized in constructing Survey Questions, as explained in more detail below. Question response module 155 receives customer responses from customer response client 120. Web pages 160 enable customer response client 120 to include a web browser that provides a customizable interface for collecting customer responses (feedback). Response table 165 stores customer responses and a survey token for referencing purchase detail table 170. Purchase detail table 170 stores purchase detail as transaction data that is collected on purchase system client 100 and associates a survey token and possibly a customer survey token with each entry.

In some circumstances, not all purchase detail collected may be stored in purchase detail table 170. For example, a merchant may pre-determine that the server should not ask any questions related to certain items. Rather than consume disk space storing purchase detail related to the items, the server may omit storing the items altogether. Alternatively, a purchase detail line may be deleted from purchase detail table 170 when it is determined that it is no longer needed. For example, certain purchase detail transaction lines may trigger purchase generator module 150 to generate a question, while other transaction lines may not cause a question to be generated. In one embodiment, during these scenarios, the transaction lines not triggering a question are deleted to conserve storage space and/or decrease access time to the other remaining transaction lines.

In a preferred embodiment, however, the check data is stored so that the survey can be contrasted with all of the check details. It is possible, however, to ignore some check items, as determined by the merchant user's discretion (although they are still stored) when generating survey questions. The existence or absence of a product/item, in the purchase table can be a factor to trigger a survey question.

Customer response client 120 is comprised of browser 130 and survey token 125. It is appreciated that browser 130 may be a web browser, application program, or any device capable of reading web pages. Survey token 125 is typically the same survey token given to the customer at the time of the sale and associated with the customer's purchase in purchase detail table 170. Before submitting responses, a customer enters this survey token to identify the particular purchase for which the responses will be given.

While entering the unique survey token to identify the purchase, the customer may optionally enter a user ID and password to identify the customer. This enables tracking of responses made by a particular customer. The purchasing behavior of the particular customer can be analyzed to provide a unique promotional experience. For example, a merchant could incentivize customer feedback by giving points or coupons to repeat customers who provide feedback regarding their purchasing experience. Alternatively, customer data can be captured through the use of a Website Contact Module (discussed below).

Purchase system client 100, server 140, and customer response client 120 may reside on the same electronic device or may reside on separate electronic devices. Additionally, one or more of the system components can be implemented on separate systems or electronic devices, such as when the purchase detail database 110 resides in a remote cloud service provider separate from the purchase system client 100.

Computing devices, such as the ones shown in FIG. 2, typically include at least some form of computer-readable media. Computer readable media can be any available media that can be accessed by the computing device. By way of example, computer-readable media might comprise computer storage media and communication media.

Computer storage media includes volatile and nonvolatile, removable and non-removable media implemented in any method or technology for storage of information such as computer readable instructions, data structure, program modules or other data. Computer storage media includes RAM, ROM, EPROM, flash memory or other memory technology, CD-ROM, digital versatile disk (DVD) or other optical storage or any other medium that can be used to store the desired information and that can be accessed by a computing device.

Communication media typically embodies computer-readable instructions, data structures, program modules or other data in a modulated data signal such as a carrier wave or other transport mechanism and includes any information delivery media. Combinations of any of the above should also be included within the scope of computer-readable media. Computer-readable media may also be referred to as computer program product.

Figure 3:
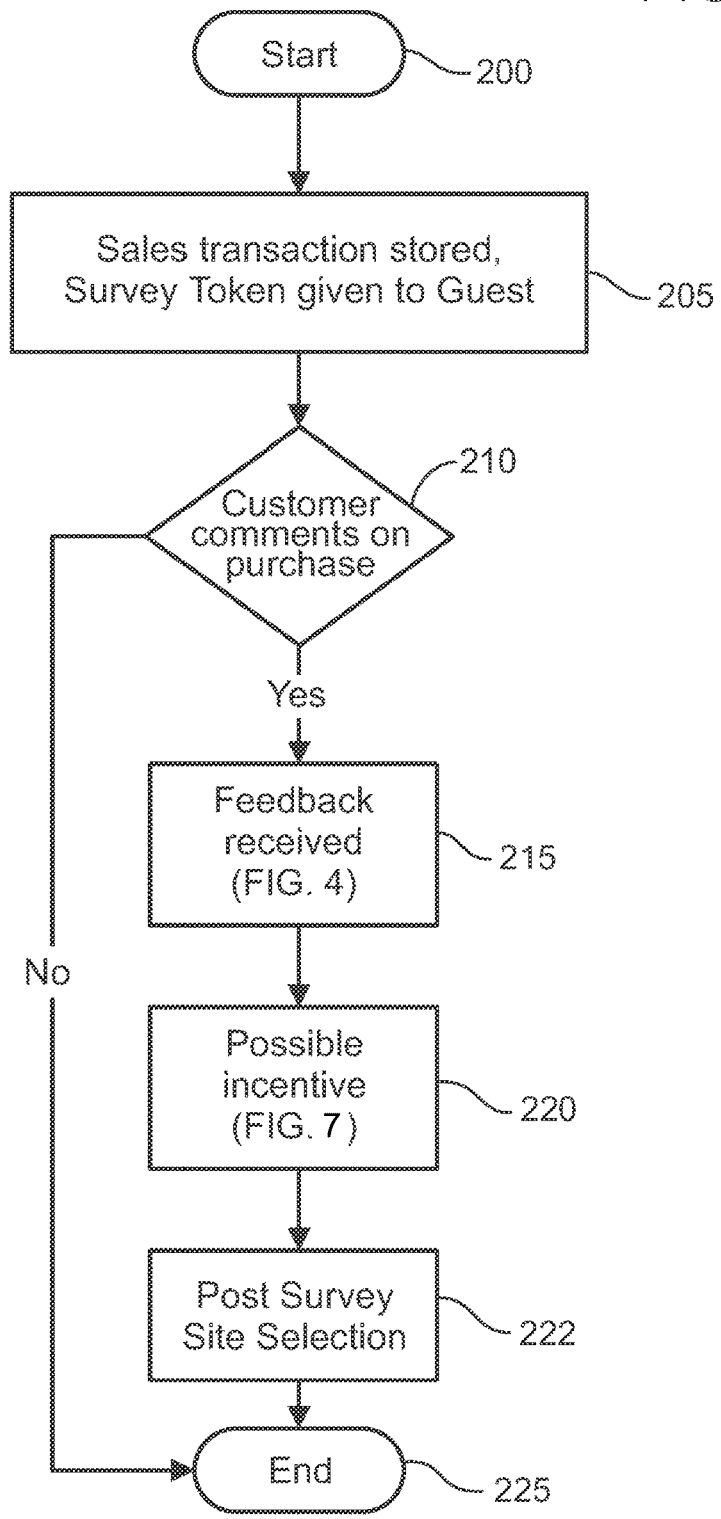
FIG. 3 illustrates a flow chart for generating questions and receiving feedback related to a purchase.

FIG. 3 illustrates a flow chart for generating questions and receiving feedback related to a purchase. The process starts at block 200 when a purchase is made.

Figure 4:
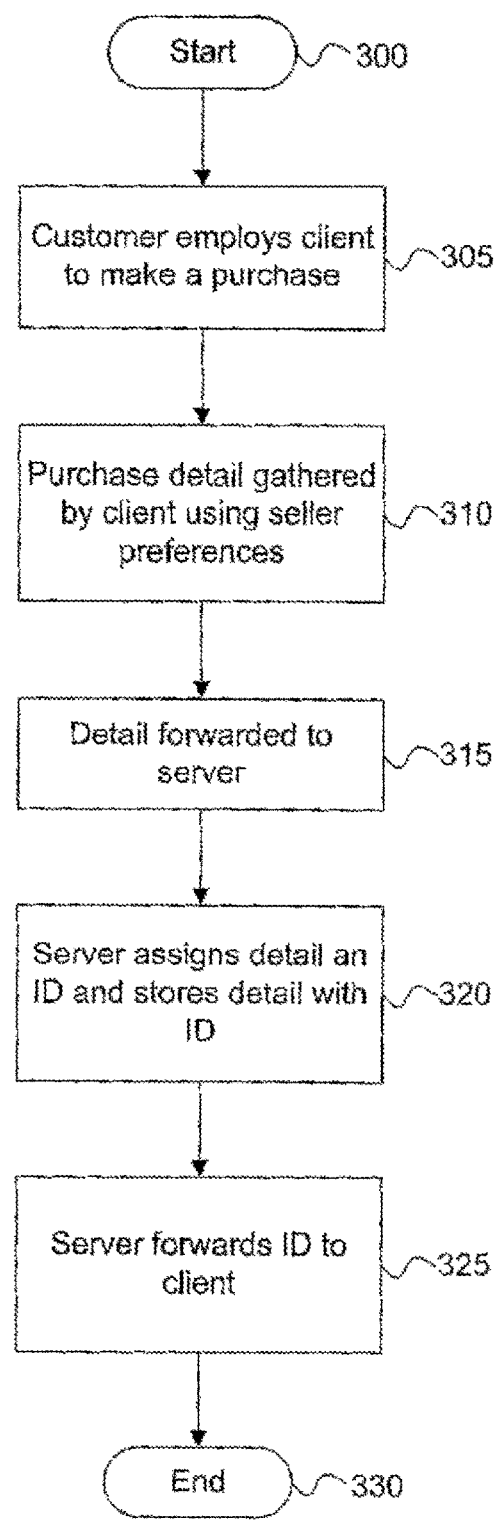
FIG. 4 illustrates a flow chart for gathering information relating to a purchase and associating a survey token with the purchase.

At block 205, a purchase occurs as described in detail in conjunction with FIG. 4. Briefly stated, a customer makes a purchase, details regarding the purchase are stored as transaction data, and a survey token identifying the purchase transaction is given to the customer where the token can be a customer account number, a combination of transaction data, or a randomly assigned value. For example, referring to FIG. 2, a customer makes a purchase at POS terminal 105. Purchase detail (i.e., transaction data) is sent to server 140, and a survey token is generated and sent back to POS terminal 105 and given to the customer.

In one illustrative embodiment, the token may be a combination of the survey time and/or date, the merchant facility location where the transaction occurred, and/or the receipt number for the transaction. The customer utilizes the browser 130 to access the merchant's branded website and enters the transaction time and date, the merchant facility location, and the receipt number. A Java tag or widget embedded in the merchant's website transmits the token information along with a Campaign identification number to the server 140. At block 210, a determination is made as to whether a survey token is valid and a survey will be generated. When a survey is to be generated, the "yes" branch is followed and the server 140 retrieves the associated Campaign data structure that includes the merchant preference data before processing continues at block 215. Otherwise, the "no" branch is followed and processing continues at block 225. It will be appreciated that feedback may be provided immediately after the transaction or any time thereafter.

Figure 5:
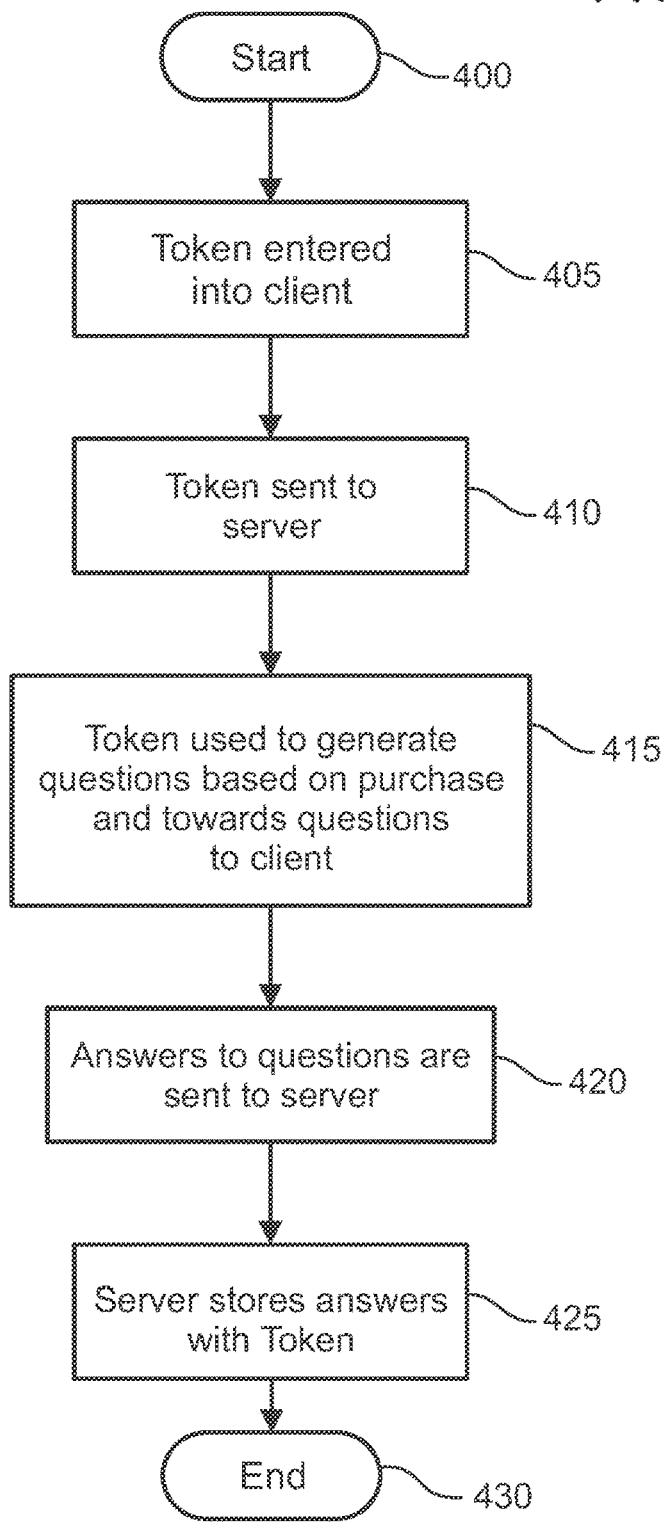
FIG. 5 shows a flow chart for automatically gathering feedback associated with a purchase.

At block 215, feedback about a purchase is received as described in conjunction with FIG. 5. Briefly stated, a survey token associated with a purchase is entered into a client computer which forwards the survey token to a server 140. The server 140 retrieves the appropriate Campaign data structure and utilizes merchant preference data within the Campaign to generate questions related to the purchase and forwards the questions to the customer response client computer 120 for display within the merchant's branded website by the browser 130. The customer response client computer 120 receives the questions, solicits responses to the questions using the browser 130, and returns the responses to the server 140 which then stores them. For example, referring to FIG. 2, a customer uses browser 130 to connect to server 140 and to provide feedback regarding a purchase associated with unique survey token 125.

In another embodiment, a server 140 may pre-generate questions after the purchase details are forwarded to the server. Pre-generating questions may be done to move the generation of questions to off-peak compute times, to speed response when the customer provides feedback, or for other reasons. The generated questions may then be stored together with the survey token that is returned to the customer. When a user desires to provide feedback, the pre-generated questions may then be retrieved by the server 140 and sent to the customer response client computer 120 receiving feedback regarding the purchase.

At block 220, an incentive, such as a promotion, may be generated. For example, a merchant may incentivize customer feedback by giving points or coupons to repeat customers who provide feedback regarding their purchasing experience. For example, referring to FIG. 2, server 140 generates a promotion and forwards it to customer response client 120. At block 222, a customer may be redirected to a Post Survey Site Selection based in part of the content of the customer comments or feedback. As an example, if a customer provided positive feedback, the system could redirect the customer browser 130 to a third party review site, such as Yelp!® or to a website where the customer can register for the merchant's loyalty program. Or if a customer left negative feedback, the customer browser 130 could be redirected to a merchant webpage apologizing for the customer experience and encouraging the customer to contact the merchant so that the merchant can address any issues surrounding a negative customer experience.

At block 225, processing ends. At this point, details related to the purchase have been recorded. When feedback is received, this is also recorded and associated with the purchase. Both the purchase detail and the feedback may be immediately retrieved for analysis and reporting. A customer may be rewarded when the server determines that a promotion is appropriate.

FIG. 4 illustrates a flow chart for gathering information relating to a purchase and associating a survey token with the purchase. The process starts at block 300 when the purchase is made.

At block 305, a customer employs client hardware and/or software (hereinafter referred to as the merchant, vendor, or client system 100) to make a purchase. Client hardware includes cash registers, personal computers, hand-held devices, multiprocessor systems, microprocessor-based or programmable consumer electronics, network PCs, minicomputers, mainframe computers, and the like. Client software typically executes on client hardware and works in conjunction with the hardware to enable the customer to make the purchase and to perform various other functions described in conjunction with FIG. 4. For example, referring to FIG. 2, a customer employs purchase system client 100 to make a purchase.

At block 310, purchase detail is collected by the client system. For example, referring to FIG. 2, the POS terminal 105 may collect price, quantity, and name of each item purchased, time of purchase, employees working during purchase the mode of service delivery (i.e., seated table, drive through, or delivery), and a survey token identifying the customer that is stored to the purchase detail component 110 either locally or at a remote location, such as a cloud service provider. An advantage of collecting this information is that the customer does not have to re-enter the purchase information when providing feedback about the purchase. Another advantage is that information the customer may be unaware of and should not need to be concerned with may also be collected such as manager on duty, cashier, supervisor, employee, technician, etc.

Yet another advantage is that the purchase detail can be used to generate customized questionnaires automatically. For example, instead of asking "How was your food?" or "Would you recommend us to a friend?" the purchase detail can be used to ask "How was your foot-long meatball sub?," "Did you enjoy the view from your room on the third floor?" or "How was your server, Joan?" Such transaction-related questions may aid the customer in providing more accurate and relevant answers. Furthermore, because a customer is not required to fill in details regarding the purchase such as what they ate, what item they purchased, the time and date of the transaction, etc., the customer may determine that the questionnaire will not require too much time to complete and may be more willing to complete it.

At block 315, the purchase detail is forwarded from the client system to a server. For example, referring to FIG. 2, purchase system client to server interface 115 sends the purchase detail to server 140.

At block 320, the server 140 receives the purchase detail as transaction data, assigns a survey token to the purchase detail, and stores the purchase detail with the survey token for future access. This allows the server 140 to retrieve the purchase detail when a client system identifies the purchase by giving the survey token. Typically, the survey token assigned will be unique with respect to other IDs stored. Over time, however, IDs may be reused. For example, after a purchase detail associated with a survey token is no longer needed, it may be deleted or archived. When the purchase detail is deleted or archived, the survey token may be available for use in identifying another purchase detail. For example, referring to FIG. 2, server 140 receives purchase detail from purchase system client to server interface 115. Then, server 140 generates a survey token and stores the purchase detail with the survey token in detail table 170.

At block 325, the server 140 sends the survey token to the client system. This allows the client system to give the survey token to a customer for use when the customer provides feedback. For example, referring to FIG. 2, server 140 sends purchase system client 100 the survey token. In other embodiments, the purchase system client 100 can generate the token at the point of purchase and transmit the token to the server 140.

At block 330, processing ends. At this point, the client system has collected purchase detail and forwarded it to the server 140. The server 140 has generated a survey token and stored the purchase detail with it for future use. Additionally, the server 140 has sent the survey token to the client system so that it may give the survey token to the customer, or alternatively, the server 140 has received and stored a token generated by the client system.

It will be appreciated that the client system may give the survey token to the customer in many ways, including displaying it for the customer to read, storing it in a file on a computer, such as in a cookie, printing it on a bar code on a receipt or check given to the customer, encoding it on a loyalty card presented by the customer, encoding it on a ticket given to the customer, transmitting it to the customer through electronic mail, transmitting it to a wireless personal communication device, and the like.

In one embodiment of the invention, purchase detail is forwarded by the POS terminal 105 to a cloud service provider or the server 140 at the time of the purchase. In another embodiment of the invention, purchase detail is forwarded in batches. When purchase detail is forwarded in batches, the survey token may be generated differently. When a customer is ready to complete a purchase transaction, typically, the customer desires to be finished as soon as possible. For example, when checking out of a grocery store a customer typically wants to pay for the items purchased and take the groceries to the car. When leaving a restaurant, a customer typically wants to pay the waiter or cashier and leave. When purchase details are sent as a batch, depending on the batch size and the number of customers, it may take several minutes or hours before a batch is sent. A customer would not likely wish to wait the minutes or hours for the batch to be sent and a survey token to be returned to the customer for use during feedback.

The wait for a survey token in a batched system may be avoided by having the client system generate a survey token immediately which it displays to the customer. Upon sending of the batched information, the client system would also send the survey token so that the server system could store the survey token given to the customer with the purchase made by the customer. In this embodiment of the invention, the server does not need to generate the survey token or send it back to the client because the client generated it. Many clients' systems, however, may be active simultaneously. Without proper integration, the client systems may assign the same survey token to two different purchases. In light of this disclosure, it will be recognized that in a batched system a method or system for avoiding or dealing with duplicate IDs may be required. One system, for example, for avoiding duplicate IDs is to assign each client a unique client survey token and to have the client embed its unique client survey token in IDs the client generates, thus creating IDs that uniquely identify purchases when multiple clients are employed in a batched system.

FIG. 5 shows a flow chart for automatically gathering feedback associated with a purchase. The process starts at block 400 when a user is ready to provide feedback regarding a purchase transaction.

At block 405, a survey token is inputted into a customer response client. Inputting the survey token into the customer response client may be done in many ways, including entering the survey token on a keyboard, using a computer on which the survey token was stored as a cookie or otherwise, scanning a bar code, swiping a loyalty card containing the survey token, etc. For example, referring to FIG. 2, a customer uses customer response client 120 to input unique survey token 125 into browser 130.

At block 410, the customer response client forwards the survey token to the server. For example, referring to FIG. 2, customer response client 120 forwards unique survey token 125 to server 140. At block 415, the server retrieves purchase detail associated with the survey token and retrieves the associated Campaign data structure and generates a survey comprised of a set of Survey Questions relating to the purchase as described in detail in conjunction with FIG. 6. Briefly, the questions generated can be related to the items purchased, the transaction amounts (i.e., price), the server (i.e., waitress or waiter), the table, the time of day, the mode of service delivery (i.e., sitting down at a table, drive through, delivery), prior survey responses, and preference data associated with merchant preferences included within a Campaign data structure. For example, referring to FIG. 2, server 140 uses the survey token to retrieve related purchase information in purchase detail table 170. Then, purchase question generator module 150 generates questions based on the detail retrieved. Typically, these questions are then formatted into web pages 160 that can be embedded into a merchant's branded website and sent to the customer browser 130.

Surveys are created using the transaction data as well as the Campaign data structure, which includes configurable Conditions, Survey Questions, and branching logic set according to merchant preferences. The questions can be prepared outside of the Campaign, as discussed in more detail below, and subsequently assigned to a given Campaign by a merchant user designing the survey. The Campaign data structure is comprised of a series of actions that can be organized into Attribute Groups where the actions include Survey Questions, Conditions, Exit Pages, Events, and Incentives.

The survey may be assembled into an autonomous, self-contained, web-container package with branching logic that changes the questions presented or the order of the questions presented based upon a survey respondent's answers to prior survey questions. In this instance, the answers can likewise be assembled into a single, self-contained package. In this manner, the system 100 can minimize the required communication between system devices that could delay survey processing.

At block 420, the questions are displayed to the customer and answers are collected. Then, the answers are sent to the server 140. When a customer does not answer one or more questions, the response(s) of not answering for the one or more questions may also be sent to the server. For example, referring to FIG. 2, browser 130 reads the questions on web pages 160 and displays them to the customer. The customer answers the questions by using browser 130 and indicates that the answers are completed. Then, browser 130 sends the answers to server 140 for use in question response module 155. The answers may be sent one-at-a-time in real time to the server, or, alternatively, answers may be grouped together and sent to the server in batches.

At block 425, the server 140 stores the answers together with the survey token for future analysis. When the server stores the answers, they are immediately available for analysis. For example, referring to FIG. 2, server 140 stores the answers with the survey token in question response table 165. At block 430, processing completes. At this point, questions related to a purchase have been generated, and feedback has been received and stored for analysis and reporting.

Figure 6:
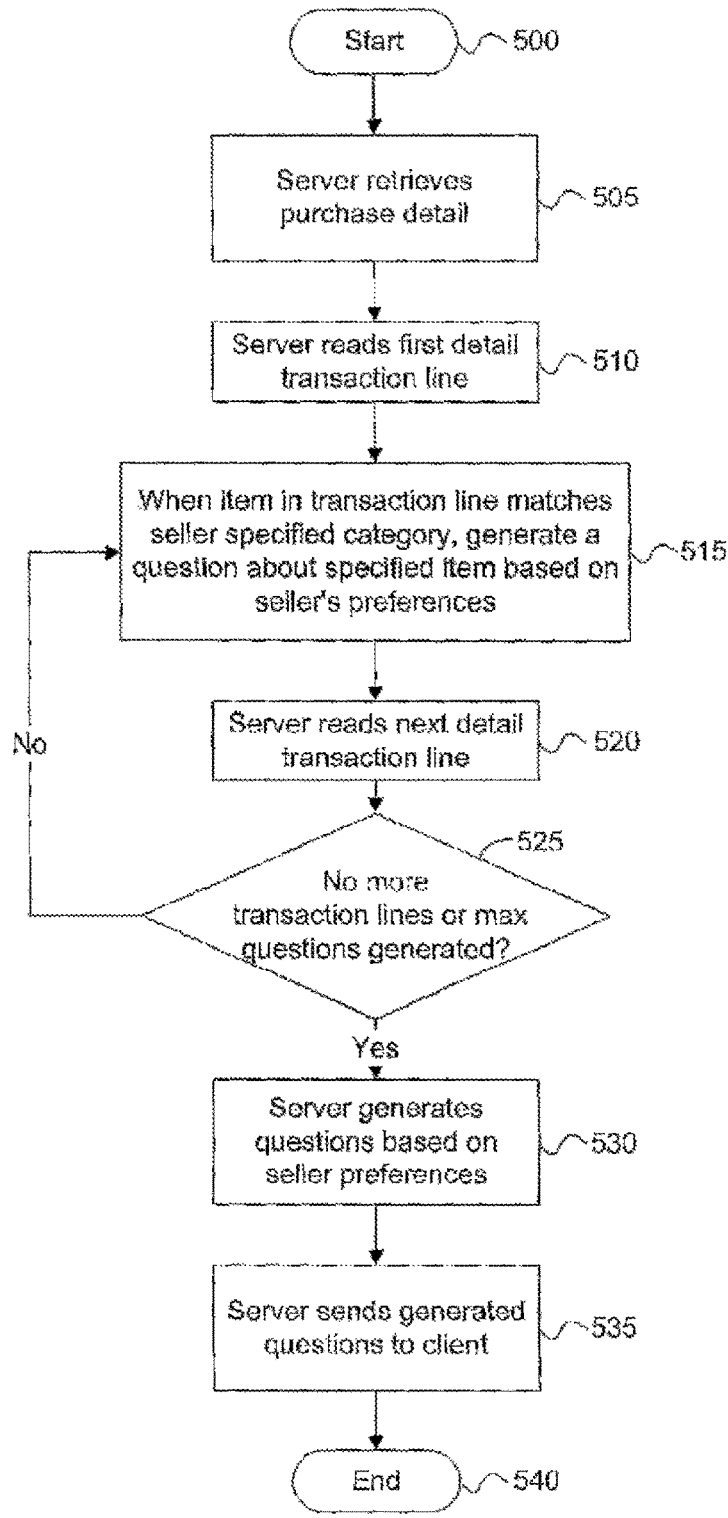
FIG. 6 illustrates a flow chart for automatically generating questions for a purchase.

FIG. 6 illustrates a flow chart for automatically generating questions for a purchase. The process starts at block 500 when a user is ready to provide feedback regarding a purchase transaction. At block 505, the server 140 locates purchase detail associated with the purchase that was previously stored on the server as transaction data as well as the applicable Campaign data structure including merchant preferences. The purchase detail can include a wide variety of data elements or vendor data categories relating to the customer experience, including the items purchased (using a product identifier), transaction amounts (i.e., price), the server (i.e., waitress or waiter), the table, the time of day, the mode of service delivery, and more. The server 140 typically retrieves the purchase detail by using a survey token supplied by the user. Usually, the survey token is associated with the purchase detail previously stored on the server as transaction data. For example, referring to FIG. 2, server 140 locates purchase detail associated with the survey token from purchase detail table 170.

At block 510, the server 140 retrieves a first transaction line from the purchase detail the server 140 previously located. A purchase may include many vendor data categories (e.g., items purchased, server identifier, mode of service delivery identifier) and each vendor data category may be associated with a different transaction line. For example, a restaurant check may have appetizers, entrees and drinks each on separate transaction lines. Referring to FIG. 2, for example, server 140 reads a first transaction line from the purchase detail.

At block 515, the transaction line is searched for merchant specified data categories. When a data category in the transaction line matches a merchant's specified category, a question about the data category may be generated depending on Conditions associated with merchant preferences in the Campaign data structure. The merchant may prefer to generate one type of question when the customer is seated at an inside table or when alcohol is purchased and another type of question when the customer is seated at an outside table or purchases soft drinks. For example, referring to FIG. 2, purchase question generator module 150 determines if a data category in the retrieved transaction line matches a merchant specified category. When a data category in the retrieved transaction line matches a merchant specified category, the purchase question generator module 150 may generate a question. At block 520, the server retrieves the next detail transaction line (if it exists) from the purchase detail. For example, referring to FIG. 2, server 140 reads the next transaction line from the purchase detail.

At block 525, a determination is made as to whether either no more transaction lines exist for the purchase or whether a maximum number of questions have been generated regarding the purchase. When either of these Conditions exists, the "yes" branch is followed to block 530. Otherwise, the no branch is followed to block 515. For example, referring to FIG. 2, server 140 determines when additional transaction lines exist for a purchase and purchase question generator module 150 determines when the maximum number of questions has been generated.

At block 530, the server generates additional questions based on preference data associated with merchant preferences in the Campaign data structure. The merchant may prefer, for example, that a question be asked regarding the quality of service rendered to the customer in addition to other questions related to specific transaction lines. For example, referring to FIG. 2, purchase question generator module applies preference data associated with merchant preferences to add additional questions to be asked to the customer.

At block 535, the server 140 sends the generated questions to the customer response client computer 120. The server 140 may do so by populating the merchant's web pages 160 that the client computer 120 accesses. For example, referring to FIG. 2, purchase question generator module 150 completes the list of questions to be asked and populates web pages 160 to be read by customer response client 120.

At block 540, processing ends. At this point, questions have been generated based on the items purchased and preference data associated with merchant preferences. These questions have been made available to the customer, typically in the form of web pages.

It will be appreciated that merchant preferences may cause questions to be generated that depend on previous questions generated and responses received. For example, a merchant may prefer that a particular question no longer be generated when no or few customers queried respond to it. In addition, a merchant may prefer that a question that has been answered numerous times no longer be generated as a large enough sample has been generated for analysis. The merchant may specify that after the question has been answered a certain number of times that another question be asked instead of the question.

Figure 7:
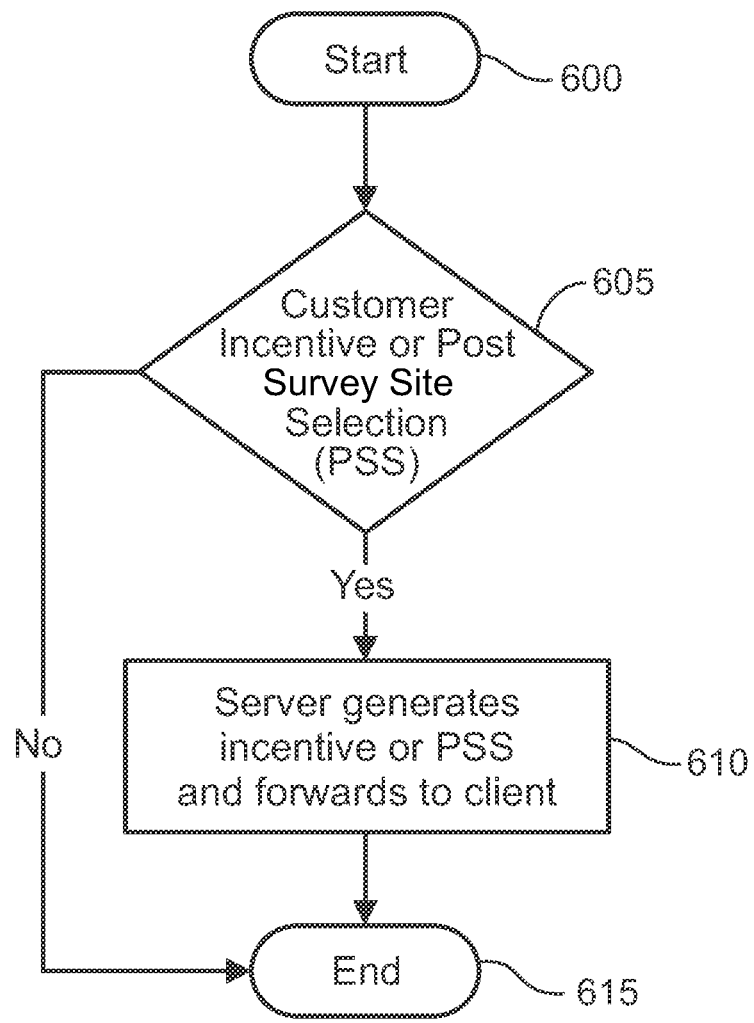
FIG. 7 illustrates a flow chart for automatically generating incentives or such as promotions to reward customer feedback.

FIG. 7 illustrates a flow chart for automatically generating incentives or customer Post Survey Site Selections, such as promotions, to reward and encourage customer feedback or a redirection to a separate website where the customer can provide additional reviews or register for merchant loyalty accounts, among other activities. The process starts at block 600 when a user has provided feedback regarding a purchase transaction.

At block 605, a determination is made as to whether an incentive or Post Survey Site Selection should be generated. The determination may depend on many factors including how many questionnaires a customer has completed, advertising needs for a particular product, the substance feedback the customer provides including whether it was positive or negative, items in the purchase transaction, random generations calculated to promote customer feedback, and/or any other factor(s) a merchant prefers. For example, a positive determination to generate a promotion or Post Survey Site Selection may occur when a customer provides positive feedback for a television (or other electronic device) for selected questions of a questionnaire. The system may determine, for example, that the customer should be given a coupon giving a discount on a selected DVD or should be redirected to leave a public review on the merchant's website or a third party site (e.g., a Google® review) concerning the television. When it is determined that a promotion or Post Survey Site Selection should be generated, the yes branch is followed to block 610. Otherwise, the no block is followed to block 615.

At block 610, the server generates an incentive (e.g., a promotion) or Post Survey Site Selection and forwards it to a client computer to give to the customer or to redirect the customer browser 130. The client computer may prompt the customer to save the promotion for future use or to print a coupon. When the customer elects to save the promotion, it may be saved on the server 140 and a survey token identifying the customer may be required. For example, referring to FIG. 2, server 140 generates a promotion and forwards it to customer response client 120. At block 615, processing ends. At this point an incentive, when generated, has been forwarded to a customer response client computer 120 and given to the customer.

Figure 8:
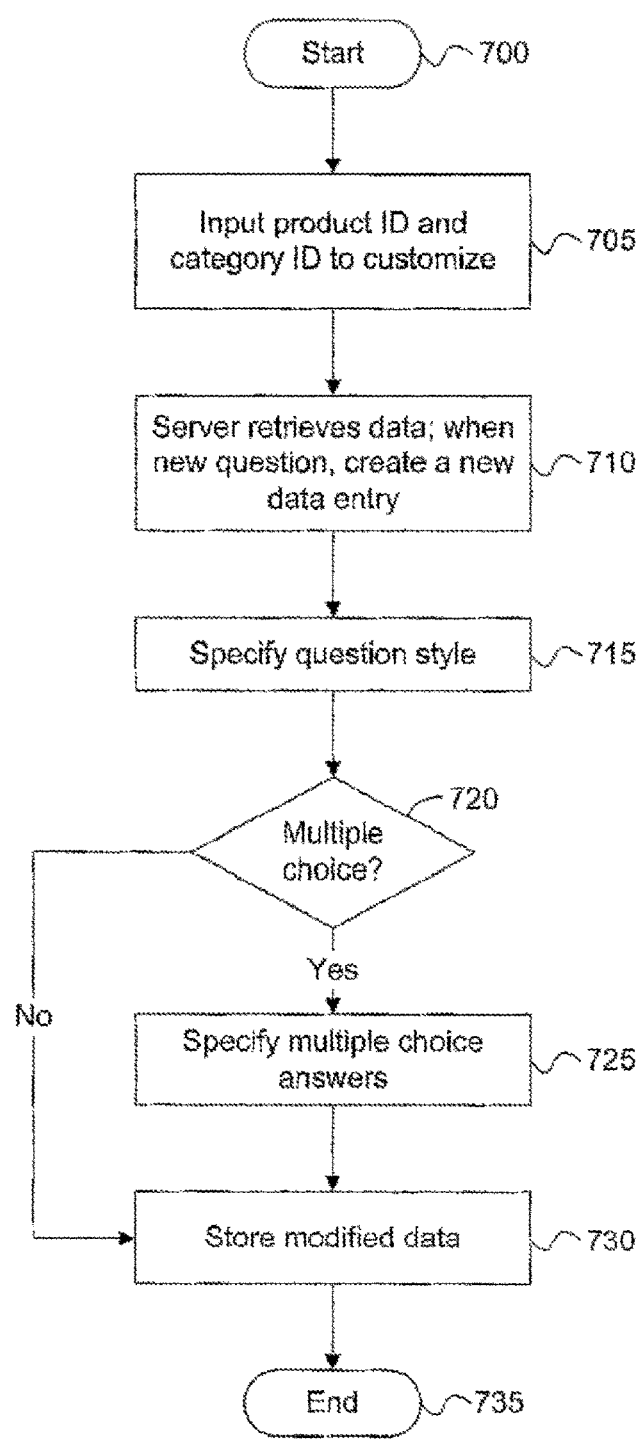
FIG. 8 shows a flow chart for specifying merchant preferences for reporting and/or for questions automatically generated for purchases.

FIG. 8 shows an example flow chart for creating survey questions. The process starts at block 700 when a merchant user desires to create a set of questions that can be included within a Campaign data structure with other merchant preferences. FIG. 8 illustrates creating questions according to product identifiers, but those of skill in the art will appreciate that the method is applicable to specifying questions with regard to other merchant data categories available within transaction data. For instance, the survey could be constructed to only present questions directed to the facility, mode of service delivery, and/or the server (e.g., waiter or waitress) so that the survey is agnostic with regard to the actual items or products purchased by the customer.

At block 705, the merchant user inputs a product identifier and a category identifier. The product identifier and category identifier identify the product or products for which preferences will be set. For example, the merchant user may enter a product identifier identifying a type of steak and category identifier identifying entrees. Referring to FIG. 2, for example, a merchant user uses a client computer (not shown) to connect to server 140 and enters a product identifier and a category identifier. At block 710, the server retrieves preference data related to the product identifier and the category ID identifier.

At block 715, the user specifies a question style and corresponding answer style. Question styles include multiple choice, yes/no, fill in the blank, rating scales, free form text responses, and the like. Question styles include questions that could be asked in a paper survey. The merchant user can also select permitted answer types, such as (i) a rating with a permissible number of stars (e.g., any number between two to eleven stars), (ii) a multiple select answer (i.e., the user may select multiple check boxes or radio buttons), (iii) a single select answer, selection of elements from a two-dimensional matrix of responses (e.g., selection of preferred days across a horizontal row and preferred times across a vertical column), (iv) an ordered list of responses (e.g., favorite menu items from most to least favorite), (v) a ribbon answer selection, such as a set of selectable icons, thumbnail pictures, etc.; or (vi) free text responses. Referring to FIG. 2, server 140 receives a selection as to which question and answer styles are desired.

At block 720, a determination is made as to whether the question style selected is multiple choice. When it is, the "yes" branch is followed to block 725. Otherwise, the "no" branch is followed to block 730. For example, referring to FIG. 2, server 140 determines whether a multiple choice question style has been selected.

At block 725, choices for a multiple choice question are selected. These choices are stored for use when the server is generating multiple choice questions regarding a purchase. For example, referring to FIG. 2, server 140 prompts the user for choices allowed in a multiple choice question.

At block 730, the question style and information about the question are stored so that the server can access the information when it is generating questions regarding a purchase. Information about the question includes such things as product identifier, category identifier, text used for the question, where to insert an item description or name, and other information relevant to generating the question. For example, referring to FIG. 2, server 140 stores information about the question and the question style in a Campaign data structure (not shown) for use when purchase question generator module 145 generates questions.

At block 735, processing ends. At this point a question style and information about a question have been stored on the server for use during automatic question generation. A merchant user creating the questions may add or change questions by repeating the process above.

FIG. 9 shows an example questionnaire that includes a list of feedback questions that could be asked of a customer. Questions 810 illustrate customer feedback questions with the names of example items purchased shown in italics along with multiple choice responses. It will be appreciated that the third and fourth feedback questions, "How was your service?" and "Will you return?" may be generated based on the preference of a merchant and may not be related to the actual items purchased.

The questions shown in FIG. 9 represent only a sample of questions that may be asked of a customer. Other question styles include star ratings, numerical ratings; fill in the blank, quality of service ratings, free form text responses, and the like.

An incentive may be provided for answering a questionnaire regarding a purchase. Illustrative incentives may include an offer for a 20% discount at the customer's next meal at Joe's. It will be appreciated that several different incentive programs could be used to encourage a customer to provide responses to a survey.

After specifying the merchant questions, a merchant user can specify merchant preference to include within the Campaign data structure that is comprised of a series of actions that include, for example: (i) Survey Questions; (ii) Configurable Conditions; (iii) Incentives; (iv) Exit Pages; and (v) Events that can all be implemented within specified Attribute Groups. When creating a Campaign, the merchant user first selects an action that can be associated with a Condition.

A wide variety of configurable Conditions can be specified as part of the Campaign. Typical Conditions can include, for instance, determining whether: (i) the transaction data includes a particular product/service identifier or a table identifier indicating the customer dined in the restaurant; (ii) the merchant facility where the transaction took place is part of a specified category or group (i.e., all locations within a mall, or all stand-alone locations, etc.); (iii) the transaction value amount fell within a particular range (e.g., between fifty to one-hundred dollars); (iv) the receipt number entered by the customer match a stored receipt identifier stored in a database of historical transaction data; or (v) the prior survey responses fell within a certain rating range (e.g., less than four stars out of ten, etc.).

Survey Question design with Conditions can be illustrated with the following simplified examples. The survey design can begin with the merchant user specifying a pre-designed Survey Question from a drop down menu that is to be included in the Campaign. The Survey Question is then associated with the Condition that the Survey Question is only asked when the transaction data includes certain information, such as only asking "How was your taco salad?" when the transaction data indicates that the customer purchased a taco salad or only asking "How was your waiter or waitress" when the transaction data indicates that the customer dined in as opposed to ordering delivery or carry out. The Condition can also depend not just on transaction data but also on prior Survey Question responses. For instance, the Survey Question "How long did it take to receive your order?" may be asked only if the Condition is met that the customer taking the survey answered a prior Survey Question by expressing dissatisfaction with the timing of the service.

An Exit Page selection as part of the survey design determines where the customer response client 120 browser 130 will be directed following the completion of a survey, which can occur as part of the Post-Survey Site Selection process. The Exit Page can likewise be associated with a Condition. To illustrate, the Exit Page may take the browser 130 to a merchant webpage advertising seasonal menu products based on a Condition that transaction data indicates the customer purchased a seasonal item. Or as another example, the Exit Page may direct the browser 130 to a third-party review website if the customer's survey responses indicated the customer had a positive experience.

The Campaign design can also include Event actions associated with a Condition that trigger a particular response or communication. For instance, an Event may be classified as a concern, response, or recovery. A recovery Event can represent an instance where survey responses indicates the customer responding to the survey had a negative experience, which triggers a notification to the merchant about the negative experience, thereby allowing the merchant to contact the customer or take another action in response.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit and scope of the present invention as recited within the claims attached hereto.

The above specification, examples and data provide a complete description of the invention. Since many embodiments of the invention can be made without departing from the spirit and scope of the invention, the invention resides in the claims hereinafter appended.

EXAMPLES

The following illustrative embodiments of individual modules can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Other features and advantages of the present embodiment will become apparent to those skilled in the art from the following detailed description. It is to be understood, however, that the detailed description above and specific examples below, while indicating preferred embodiments of the present embodiment, are given by way of illustration and not limitation. Many changes and modifications within the scope of the embodiments disclosed herein may be made without departing from the spirit thereof, and such embodiments include all such modifications.

WS-Based GSM

The WS-based Customer Survey Module (GSM) of the current invention allows merchants to integrate a GSM into their branded website allowing integration to both survey templates and actual check details. All administration of the GSM occurs within a Data Collection Handler (DCH) web-based portal. The WS features are implemented as a multi-unit (MU) role based services; this allowing an MU login to be setup by survey Attribute Group scope for either centralization or decentralization based upon MU login scope to units.

The challenge of this type of survey concept is to get the customer to volunteer to complete a survey. One solution is to offer limited support for incentives (such as promotions described below). Another solution is to 'gamify' the survey. For example, providing a bingo letter/number that the user can then use to start filling in a bingo card, and the winner gets a better prize. In order to fill the bingo card, the customer is encouraged to come back for another purchase and survey round.

At the time of the sale, the POS provides a printed survey token (either directly on the check/receipt or on separate piece of paper) that allows the system to retrieve check data in order to complete a survey. Additionally, check information and the token can be provided electronically such as through email or the use of a mobile application. The survey invitation begins with a survey token being generated by the POS, this token is preferably a concatenation of STORE+DATE+CHECK, and presented on the customer check. These three (3) key informational components (unit, check-date, and check number) are used by the DCH to retrieve, with a high level of confidence, information about the check.

The structure of the token in this preferred embodiment can be literally described as "0103+01282011+12345". It is possible, however, to support different masks, per unit, depending upon what POS is in use by individual units. The GSM-WS uses the survey token as a passed service parameter to determine the actual unit, business-date (by using start of business day rules), and check number. The POS system, plus other cards and placards, etc., can request that the customer to complete a survey at the merchant's website (e.g. www.somemerchantwebsite.com/surveys). The target website will then prompt the customer to enter the survey token, or similar. It is also possible, when the customer is known to the POS, such as via a customer loyalty program, the POS (or related CRM) may generate a direct email with an embedded link requesting the loyalty program member to complete a survey.

Many POS systems are not able to universally provide some form of printed token that will allow the DCH to retrieve check data in order to complete a survey. If a POS is not able to generate a survey token, the customer check is still likely to contain the three criteria (unit, check-date and check number) needed to locate the requisite data. The GSM web-service provides support for both survey-token and/or manual entry of unit, date and check as they appear on most printed customer checks.

Data Structure

In a preferred embodiment, surveys are template based thereby allowing a merchant to deliver more than one survey type at a time to its customers. The following represents an illustrative Campaign data structure:

Campaign Data Structure—a collection of settings that describes one or more surveys that can be deployed to one or more restaurants using Conditions to organize surveys into Attribute Groups, and with start-on-date viewing for changing surveys;

Survey Master Questions—permanent key based list of questions that can be reused in different surveys, having durable research value independent of differing survey Campaigns;

Survey Questions—taken from the Survey Master Question as a permanent key instance; a collection of these questions are joined to the Campaign Data Structure;

Respondent Header—the response header is generated by the customer respondent and contains the information about the survey response itself; a survey is likely to have many responses, but there should only be one response per unit/customer/check instance;

Respondent Details—detail rows of the Response Header containing customer response for survey questions, item surveys and comments;

Incentive Master—a table of incentive or promotion descriptions that might be offered as incentives for survey completion.

The system can select from the list of surveys a complete survey based upon check content and/or context around the check. For example, the system generates a different survey if the customer is known (a loyal customer) vs. an anonymous customer, or the system can generate a survey based upon what time of day they interacted with the merchant, etc. This is in addition to the fact that individual questions within the chosen and generated survey can be context controlled.

An illustrative Campaign Data Structure could consist of the following columns:

Survey Description
Active (Hide) {Active, Inactive}
Active Date
One or more Rate Items
Configurable Conditions
Exit Page
Survey Questions
Incentives
Events
Grouping (up to 3 nested Attribute Groups)
CkDetails Exist Action {Details and Questions, Details Only}
CkDetails Missing Action {Questions Only, No Survey}
Allow Customer Edit Hrs (0-999, default 0.5 Hrs)
Special Offer (can be null or select from Special Offer Globally Unique Identifier (GUID)/list)
Require Customer Authentication {Checked, Unchecked}
>->>>Campaign Data Structure organized into Attribute Groups using configurable Conditions
>->>>Survey Questions (described below)

The Campaign Data Structure can include a plurality of Rate Item data columns that can each represent a broad array of measurement types, such as quality, value, taste, survey respondent preference, survey respondent satisfaction, among others. The configurable Conditions allow survey organization into Attribute Groups, such as creating a Condition that all facilities of a certain size range will utilize a given set of survey questions while smaller facilities will receive a different set of survey questions.

When a survey is created by the system it should default to being hidden—so that at first it cannot be seen. The hidden column should be designated as 'Active' and 'Inactive' for this purpose. An active survey Campaign is by default active for all stores with optimistic and/or assigned Attribute Group associations, according to the greatest active date. Only one survey can be active per customer per store at a time—however if an active survey can't be found for a store a return message to the WS caller must be provided.

The system does allow a collection of surveys to be available to the survey taker, and the selection logic is applied to the collection so that only one survey is generated. The selection can have to do with venue (where the customer interacted with the merchant), or the check content (what they did, or did not purchase), or the size of the transaction, etc. It is generating different surveys to a repeat survey taker that keeps the customer more interested in participating by allowing variety in the survey itself.

The Active Date should default to the current date and should not be null. When the Rate CkDetail Quality is set to true the Survey Result table is populated for all sold items with the row flagged to measure the quality of the item. Likewise when the Rate CkDetail Value is set to true then the survey result table is populated with Detail Value types per items sold. The CkDetails Exist Action and CkDetails Missing Action work together to configure how the GSM webservice will respond in the event that check details are found, or not found. If details do exist then the merchant has the option to only survey the check items sold, based upon the configurable options, or they may want to survey the details and appended general survey questions.

If check details do not exist (e.g. there is a network problem or the POS data has not yet been received by the DCH) the Ck Details Missing Action allows the system to deliver the general survey questions, or to reject the survey and include a rejection statement such as "The check you entered is not yet available in the survey system—please check back tomorrow." The Allow Customer Edit Hrs determines the amount of time a customer could come back and change their survey. If set this value is set to zero, then once the web-site sends the survey result a subsequent request for this same survey token would result in an error message: "This survey was previously completed; no survey is available." The Incentive, when not-null, will hold a GUID linking to the details of the incentive and this information will be available to the web-site according to the Incentive instructions (see Incentive Processing). Setting the Require Customer Authentication flag requires that a customer authenticate (see Customer Authentication) to submit the survey and/or to receive the incentive benefit if so directed by the setup.

Survey Master Questions

In the preferred embodiment, the Survey Master Questions include the following illustrative columns, although other answer types are contemplated, (defaulted column values showing in bold):

Survey Question (vchar)
Required {Checked, Unchecked}
Answer Type {Starred Rating (2 to 11 stars), Single Select, Multi-Select, Matrix, Ordered List, Ribbon, Free-text}
Answer List (vchar—can be null for if so permissioned by Required setting)
Hide {Checked, Unchecked}

The master list of permanent questions is contained in this list. If a question goes out of favor it can be hidden, but it still may be referenced by an older survey. Hiding a question only makes it so that it cannot be looked up in the survey form or in a report parameter. The Survey Question should be able to hold a significant paragraph in the order of 400 characters minimum. If a response is 'Required' the flag indicating such should be set to true; however it is up to the merchant web-site to manage this flag—the GSM web service module generates the flag but does not enforce it.

The system supports, at least, the following Answer Types: Up to 11-Stars where the website will allow an integer recording "1" through "11" as the result. Anything other than 1 to 11 will not be stored by the DCH for this type; Single Select will allow the customer to select one answer from a multiple choice list; Multi-Select will allow the customer to select multiple choices from a multiple choice list. The Answer List is also a large storage vchar column that will hold a pipe delimited list of answers that will build the multiple choice list of answers to the question; this column can be null if the Answer Type equals 'Starred Rating.

Response Header

The Response Header includes the following columns (DCH generated column values showing in bold):

Survey Master GUID
Response Instance GUID
Merchant GUID (can be null)
UnitID
Check Number (can be null)
Check DateTime (can be null)
Server/Cashier (can be null)
Table/Station (can be null)
Check Duration (can be null)
Special Offer Grant (can be null)
Request Manager Contact {checked, unchecked, null}
Wrong Check {checked, unchecked, null}

The Result Header table will be generated by a 'Microservice container', addressable by IIS. The generation of the survey contains the Survey Master GUID, and the Response Instance GUID, the instance representing a single survey instance of the master and the join for Response Details. If the merchant has authenticated then the Merchant GUID would be stored, or else we store a null. UnitID, Check Number, CheckDateTime, Server/Cashier, Table/Station, and Check Duration are all columns populated from the original survey token and only if the check data is found at the time of survey. The Special Offer Grant is assigned if an offer exists with the survey and the customer qualifies (for example both in terms of completed survey and number of prior offers extended). Request Manager Contact is the only web-client-side editable column in the Result Header; this option can be set to Checked/Unchecked or left as NULL. The Wrong Check state can be Customers' Web Site Designer (CWSD) utilized allowing the customer to declare that the check presented by our service was not identified as the correct customer check.

Response Details

The Response Details include following columns (DCH generated column values showing in bold):

Survey Instance GUID
Type {Item Quality, Item Value, Question}
Question/Item GUID
Answer (vchar)
Comment (vchar)

The Response Details table is generated by the GSM service (discussed below). The generation of the survey contains Survey Instance GUID, this key joining data to the Response Header. The Type column holds the row-type of generated survey-result rows. A row type of Item Quality is generated from check details and only when the Rate Detail Quality flag of the survey is set to 'checked' (or true); this is also the case with Item Value and its corresponding flag named Rate Detail Value. Both the Item Quality and Item Value are automatically generated as '5-Star' survey rows. A row-type of Question indicates that the row is an answer to a survey question and the answer is in accordance with the Master Question option for answering the question. The Answer column must be large enough to store the multiple or single choice selections of the survey and will store the character value of '1', '2', '3', '4' or '5' for 5-Star values; null or empty Answer values will be considered to be invalid or were ignored by the customer. The Comment column is an optional value that can be populated by the web-site for each generated survey result row.

Incentives Master

The Incentives Master includes the following columns (defaulted states shown in bold):

Incentives Name (unique)
Incentives Details (vchar-1,000)
Incentives Restrictions (vchar=1,000)
Limit Mode Per Guest {None, Per Month, Per Week, Per Day, Total}
Limit Count {0, zero unlimited; 1-9999}

The Incentives Master table holds a list of offers, plus details of that offer and control settings that the GSM uses to limit excessive repeat customer redemptions on an offer.

Web Portal Tasking

The system provides, as a part of the web portal tasking function, an administrative task named [Guest Survey Setup]. This task is organized in sub-tabs of "Survey Master Questions," "Incentives,", and "Survey Campaigns." All of the setup work for creating a new survey, creating and maintaining survey questions and offers, and the collection of this information known as a survey Campaign. The form is preferably presented as a wizard with the option to show/hide the individual sub-tabs. Full wizard-tools can be provided for all row-elements (including child rows) for copy/paste to enable highly efficient setup of customer surveys.

The [Store Master] includes a column named [POS Unit survey token]. This column is populated with the existing unit number on conversion and upon a new row insert. Subsequent maintenance of this column is done by the DCH administrator. The POS Unit survey token is used to translate the unit portion of the survey token to retrieve the actual DCH UnitID used for subsequent web-service calls.

The Store Master row is where attributes about the selling store are stored. The connection to the POS Unit survey token is that the system provides mapping between the POS data (using the token or otherwise) from the merchant site to our store row.

RESTful API Tasking

The system preferably includes a new service locator URL for the Customer Survey Module (GSM) according to a predefined URL convention. An illustrative convention could be www.awcsx.com/BigTacos/survey and and a service login. The GSM includes multiple services required for implementing the inventive method on the system. Services include:

[GetGSMUnit]—identifies the DCH unit from customer check information;
[GSM Customer Authentication]—optional feature to allow a returning customer to authenticate;
[GSM Create/Edit Customer]—optional feature allows customer to create/edit their information;
[GenerateSurvey]—generates the survey data;
[EditSurvey]—allows the edited survey data to be stored in the DCH; and
[GetSurveyState]—allows the survey to be validated as complete and with limited support for generating coupon benefits on a completed survey.

A [GetGSMUnit] service allows the merchant's web site designers to pass some or all of the following data for the purpose of locating the correct DCH unit, business date and check. For example the website may already have a store locator and this locator might be used instead of a survey token (if the POS is not able to produce the token) and in this case the locator would pass to the DCH the necessary columns to start the survey process. The following are examples of the columns that could be passed to the GetMSMUnit service:

Survey Token
External Unit Number
External Unit Description
External Unit Address
External Unit City
External Unit State
External Unit Zip
External Check Number
External Check DateTime Although variations are possible, the sequence precedence for this service of the preferred embodiment is important. The service must first ascertain if it can locate an actual DCH unit, and if not, the service generates a unit locator error. If a unit is found the service second will look for a valid Survey Template, and if none found a Survey locator error is generated. If a survey is found the service will third convert the check to a business date (for after midnight check DateTimes) and fourth attempt to locate the check. If a check is found, or not found, the resulting survey or error message response is determined by settings in the Survey Header. The following are examples of service response columns:

Unit ID
Survey Description
Master Survey GUID
Details Exist Mode
Details Missing Mode
Require Customer Authentication
Special Offer GUID
Special Offer Name
Special Offer Details
Special Offer Restrictions
Check Number
Business Date
Service Error Message The [GSM Customer Authentication] service allows a customer to either create or authenticate using an extant reference. The keys to customer authentication are [Last Name] and ([Phone] or [Email]). There is no secure data contained within this authentication—the purpose of authentication is to identify a regular customer and to have some mechanism for the manager/software to generate replies to surveys. The service will allow these values to be passed:

DCH Unit ID (required)
Customer Last Name
Customer Phone Number
Customer Email Address The return values for authentication indicate that the customer was located; a null return indicates the customer information does not exist for this store. We won't know if the CWSD has their own customer tracking so this feature will be used to coordinate our customer table with web-site customers. The DC customer table only contains Customer Contact (for contact name) so the service will have to perform an 'IndexOf( )' determination on last name and then find either an email and/or phone number correlation. The result set for GSM Customer Authentication is:

Contact Name
    Contact City
    Contact State
    Contact Zip
    Customer GUID The [GSM Create/Edit Customer] allows the merchant's web page to react to a failed customer authentication or to handle a new authentication or allow a customer to edit an existing authentication. Service-confirmation returns the Customer GUID for successful insertion or an edit success or fail error message.

Examples of service options include:
    Customer GUID (if null then service assumes create, else it assumed edit)
    Master Customer GUID (can be null)
    Customer Salutation
    Customer First Name
    Customer MI
    Customer Last Name
    Customer Suffix
    Note: We concatenate SalFN+MI+LN+Sfx into our [Cusomer.Contact Name]
    Customer Address1
    Customer Address2
    Customer City
    Customer State
    Customer Zip
    Customer Cell (one of Cell/Phone/Email required to insert new customer row)
    Customer Phone (one of Cell/Phone/Email required to insert new customer row)
    Customer Email (one of Cell/Phone/Email required to insert new customer row)

The [GenerateSurvey] service generates the actual survey response rows or may generate an error message according to survey setup requirements. Example service options include:

UnitID (required)
    MasterSurveyGUID (required)
    Check Number (optional)
    CheckDateTime (optional)
    CustomerGUID (optional)
    Return: Survey Instance GUID or NULL if not possible
    Return: Service Error Message The generated survey must follow all of the rules of survey header (mastersurveyGUID). For check-details the CkDetail Scope Limit is used to include only those items belonging to the limiting Attribute Group. If this group is not established, then all sold items are included in the group. The check details are consolidated using the DCH Item description, so that if more than one "7 oz. Sirloin Steak" was sold, only one instance would appear in the survey, but the quantity of sales would be part of the result description, such as "(2)—7 oz. Sirloin Steak". These survey descriptions would be doubled if the customer rates both the quality and value of check details.

A call to the [EditSurvey] service will return all of the rows generated by the service provided that the GenerateSurvey did not result in an error. This service will return row sets, but the service is initiated on the following:

Survey Instance GUID (required)

The service returns the following row(s) columns according to the generated survey, fields that can be edited and re-submitted are indicated in bold:

SurveyRowGUID
    RowType {Item Value, Item Quality, Question}
    RatingType {5-Star,Single-Select,Multi-Select}
    Item/QuestionText
    AnswerOptions (1,2,3,4,5 for 5-Star)
    ResponseRequired
    SurveyResponse
    SurveyComment The cycle plan for this EditSurvey is that the CWSD passes the only SurveyInstanceGUID as the initial pass to fill the return dataset with the survey rows. Our instructions indicate that the CWSD must build the survey presentation, including managing the multi-select and single-select answers as well as a starred rating system and that the customer responses are stored in the SurveyResponse row column, and if the CWSD so enables, a corresponding comment. The CWSD, when sending the completed survey is required to only send the SurveyInstanceGUID, SurveyRowGUID, and the SurveyResponse (and optionally the SurveyComment). DC will save the survey but it is up to the CWSD to maintain, at the client (browser) things like required answers.

The [GetSurveyState] service requires only a passed parameter of SurveyInstanceGUID. The dataset returned is:

SurveyState {Partial, Complete}
    IncentiveGUID
    IncentiveName
    IncentiveDetails
    IncentiveTerms
    ErrorMessage This last service step provides a confirmation (or lack thereof) to the CWSD so that a coupon or other incentive can be rendered by the CWSD, complete with an incentive name, details, terms and the GUID for incentive tracking. If the incentive exceeded a limit the error message would display the limit. If a merchant does not want to utilize incentives, these columns would return nulls.

IP Blocking

Another aspect of the inventive system includes the ability to present an administrator with a list of IP addresses as 'select-distinct' from all IP's that have ever generated a website contact or survey. A second column [Block] should allow the admin to set a block on the IP address.

The web-services for generating a survey or web-site contact must check the blocked IP list, and if the IP is found to be blocked the service should return a message that the IP is blocked. The Customer Survey and Web Site contact apps must simply report that 'The underlying service is not available at this time.' and no further processing should be allowed for that IP.

Website Contact

The website contact feature is a special subset of the current configurable survey. In general the feature allows merchants to bury a small java-tag into their website to call a dedicated Website Contact form. The form works like the current survey in that the first page will allow the customer to select a unit, but instead of selecting a date and check, the date is always defaulted to the current server date-time, and no check information is required. The next page asks the customer to identify themselves, but in this case 'I prefer to remain anonymous' is not allowed. The next page generates the two questions and one comment in a single page. The submit page provides the customer a last point before submitting the comment, and the Thank you page provides a simple thank you statement.

Customer Survey Review

Reporting will be the primary method for users to review surveys but the DCH client also provides a platform for reviewing surveys as well as the preferred platform for DCH administrators to manage junk surveys. Just as forum administrators can manage the occasional problematic forum entry, the DCH administrator for surveys is able to invalidate a toxic survey.

The Customer Survey Review feature is preferably presented as a wizard for Admin/MU and Unit access. The start page of the wizard could provide the following filters:

Unit (required)

Campaigns (multi-select of possible templates, default to 'All')

Questions (multi-select to master questions, default to 'All')

Minimum and Maximum scores (default to 'All', if present filters only those questions that have an associated answer score)

From and through dates (filters dining dates, default to current-7 through current)

Questions and scores are filter tests for survey details while Unit, Campaigns, and Dates are survey header filters. There is preferably a hidden filter for MU and U users that will filter out 'Junk' surveys allowing only administrators to see surveys/questions marked as junk.

Clicking next opens a combination of grid (top panel) and grid (lower panel). The top panel should display the survey headers and the bottom the survey questions, answers and scoring (many to one). The data should appear as read-only.

The administrator is able to see all surveys and questions, including headers and questions marked as junk. The survey header and survey questions should have an 'YN (checkbox)' column named junk. Because the data is to be shown as read-only, two TOOLBAR actions should be available to the administrator:

Mark Survey as Junk

Mark Question/Response as Junk

These two should show as a toggle, so that a survey or question accidentally therefore marked can be un-marked. Also for the administrator there should be a TOOLBAR option to 'Block Survey IP'. Clicking this feature would write the IP address of this survey into the blocked IP list.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit and scope of the present invention as recited within the claims attached hereto.

The above specification, examples and data provide a complete description of the invention. Since many embodiments of the invention can be made without departing from the spirit and scope of the invention, the invention resides in the claims hereinafter appended.

What is claimed is:

1. A system for implementing transaction-specific surveys comprising:
   (a) a point-of-sale interface used in conducting a commercial transaction between a consumer and a vendor, the point-of-sale interface being configured to record transaction data relating to the commercial transaction wherein the transaction data comprises at least one purchase detail identifier and a survey token;
   (b) a survey server computing device configured to receive and store the transaction data generated by the point-of-sale interface, wherein:
      (i) the survey server computing device comprises (A) a vendor database storing a plurality of purchase detail identifiers, and (B) a campaign data structure having survey question data and a configurable Condition that is satisfied by the detection of a given purchase detail identifier; and wherein
      (ii) the survey server computing device is configured to perform the operations comprising (A) receiving a survey token, (B) retrieving the transaction data having the stored survey token corresponding to the received survey token, (C) determining whether the transaction data includes the given purchase detail identifier such that the configurable Condition is satisfied, and if the configurable Condition is satisfied, generating a Survey Question using the given survey question data and the purchase detail identifier, and (D) generating a Survey Module comprising software code for displaying the at least one Survey Question;
   (c) a vendor survey interface configured to perform the operations comprising: (i) transmitting the survey token to the survey server computing device; (ii) receiving from the survey server computing device the Survey Module; (iii) generating a graphical user interface on a display screen; (iv) running the Survey Module to display the at least one Survey Question as an integrated component within the graphical user interface; (v) generating a Respondent Header based on user-generated inputs in response to the at least one Survey Question; and (vi) transmitting the Respondent Header to the survey server computing device.

2. The system of claim 1, wherein: (a) the vendor survey interface is implemented as a web server computing device; (b) the graphical user interface is a host vendor webpage; (c) and the Survey Module is a webpage frame configured for display as an integrated component of the host vendor webpage.

3. The system of claim 1, wherein the point-of-sale interface is implemented as a point-of-sale computing device.

4. The system of claim 3, wherein (a) the point-of-sale computing device transmits the transaction data to a cloud server, and (b) the survey server computing device is configured to receive and store the transaction data transmitted by the cloud server.

5. The system of claim 1, wherein vendor survey interface is implemented as a software application running on a mobile computing device, and the survey token is input by the consumer to the vendor survey interface.

6. The system of claim 1, wherein the survey token comprises a combination of purchase detail identifiers that identify the commercial transaction.

7. The system of claim 1, wherein the point-of-sale interface and the vendor survey interface are both implemented as a software application running on a mobile computing device.

8. The system of claim 1, wherein:
(a) the campaign data structure further comprises an Exit Page that points to a webpage address and a second configurable Condition that is satisfied based on a Survey Question response;
(b) the display screen that displays the graphical user interface is an integrated component of a customer response client computing device, and the graphical user interface is displayed by a web browser integrated with the customer response client computing device; and wherein
(c) the survey server computing device is further configured to perform the operation of incorporating within the Survey Module software code that redirects the web browser of the customer response client computing device to the Exit Page, if the second configurable Condition is satisfied.

9. The system of claim 1, wherein:
(a) the survey server computing device further comprises an Attribute Group database comprising one or more purchase detail identifiers sharing a preselected attribute;
(b) the campaign data structure further comprises a second configurable condition that is satisfied if a certain purchase detail identifier shares the preselected attribute; and wherein
(c) the survey server computing device is further configured to perform the operations of (E) determining whether the transaction data includes the certain purchase detail identifier that shares the preselected attribute such that the second configurable Condition is satisfied, and (F) if the second configurable Condition is satisfied, generating a second Survey Question using the survey question data and the certain purchase detail identifier.

10. The system of claim 1, wherein:
(a) the purchase detail identifiers comprise a product/service identifier that represents a products/service available for purchase through the vendor; and
(b) the Survey Question comprises a Product Survey Question relating to the product/service.

11. The system of claim 1, wherein:
(a) the purchase detail identifiers comprise a vendor facility identifier that represents a vendor facility used by the vendor for commercial transactions; and
(b) the Survey Question comprises a Facility Survey Question relating to the vendor facility.

12. The system of claim 1, wherein:
(a) the purchase detail identifiers comprise a vendor personnel identifier identifying vendor personnel; and
(b) the Survey Question comprises a Vendor Personnel Survey Question relating to the vendor personnel.

13. The system of claim 1, wherein:
(a) the purchase detail identifiers comprise a service mode identifier that represents a mode of service; and
(b) the Survey Question comprises a Service Mode Survey Question relating to the mode of service.

14. The system of claim 10, wherein:
(a) the purchase detail identifiers further comprise at least one vendor facility identifier that represents a vendor facility where the commercial transaction occurred;
(b) the campaign data structure comprises a second configurable Condition that is satisfied by the detection of a given vendor facility identifier;
(c) the survey server computing device is configured to perform the further operations comprising (E) determining whether the transaction data includes the given vendor facility identifier such that the second configurable Condition is satisfied, and if the second configurable Condition is satisfied, generating a Facility Survey Question using the survey question data and the given facility identifier, and (F) incorporating within the Survey Module software code for displaying the Facility Survey Question.

15. The system of claim 14, wherein:
(a) the purchase detail identifiers further comprise at least one internal facility location identifier identifying an internal location within a vendor facility;
(b) the campaign data structure comprises a third configurable Condition that is satisfied by the detection of a given internal facility location identifier;
(c) the survey server computing device is configured to perform the further operations comprising (G) determining whether the transaction data includes the given internal facility location identifier such that the third configurable Condition is satisfied, and if the third configurable Condition is satisfied, generating an Internal Facility Survey Question using the survey question data and the given internal facility location identifier, and (H) incorporating within the Survey Module software code for displaying the Internal Facility Survey Question.

16. The system of claim 1, wherein: (a) the survey question data includes at least one General Survey Question that is not specific to the transaction data; and (b) the survey server computing device is further configured to perform the operation of incorporating within the Survey Module software code for displaying the at least one General Survey Question.

17. The system of claim 1, wherein the Campaign data structure further comprises a Max Question configurable Condition setting a maximum number of survey questions included within the Survey Module.

18. The system of claim 1, wherein:
(a) the Campaign data structure further comprises an Event that triggers an electronic notification transmitted to a vendor representative and a second configurable Condition that is satisfied based on a Survey Question response; and wherein
(b) the survey server computing device is further configured to perform the operations of (E) incorporating within the Survey Module software code that determines whether the second configurable Condition is satisfied, and (F) that implements the Event to transmit an electronic notification to the vendor representative, if the second configurable condition is satisfied.

19. A computer-implemented method for providing transaction-specific surveys comprising the operations of:
(a) providing a survey server configured to receive and store transaction data generated by point-of-sale interface relating to a commercial transaction between a consumer and a vendor, wherein
 (i) the transaction data comprises purchase detail identifiers and a survey token; and
 (ii) the survey server comprises (A) a vendor database storing a plurality of purchase detail identifiers, and (B) a campaign data structure having survey question data and a configurable Condition that is satisfied by the detection of a given purchase detail identifier;
(b) receiving by the survey server, a survey token;
(c) retrieving by survey server, the transaction data having the stored survey token corresponding to the received survey token;

(d) determining by survey server, whether the transaction data includes the given purchase detail identifier such that the configurable Condition is satisfied, and if the configurable Condition is satisfied, generating a Survey Question using the survey question data and the purchase detail identifier;

(e) generating by the survey server, a Survey Module comprising software code for displaying the at least one Survey Question as an integrated component within a graphical user interface;

(f) transmitting by the survey server, the Survey Module to a vendor survey interface; and (g) receiving by the survey server, a Respondent Header generated based on user-generated inputs in response to the at least one Survey Question.

* * * * *